United States Patent Office 3,251,783
Patented May 17, 1966

3,251,783
METHOD OF PREPARING AN ALUMINA SUPPORTED CATALYST COMPOSITION
Carl D. Keith, Summit, John H. Koch, Jr., Nutley, and Bernard Seligman, Mountainside, N.J., assignors, by mesne assignments, to Engelhard Industries, Inc., Newark, N.J., a corporation of Delaware
No Drawing. Filed July 20, 1960, Ser. No. 44,021
11 Claims. (Cl. 252—463)

This invention relates to a method for the calcination of alumina hydrate to obtain a product useful as a catalyst base. More particularly, the present invention is concerned with the calcination of hydrate alumina compositions which comprise a predominant amount of trihydrate to obtain a calcined alumina of the type set forth in U.S. Patent No. 2,838,444, exhibiting desirable physical properties as well as good activity for the conversion of petroleum hydrocarbons. The calcined alumina provided by the method of the present invention is especially useful as a supporting base for platinum metals, most advantageously platinum, as a catalyst for the reforming of petroleum hydrocarbons boiling in the gasoline range.

Reforming catalysts produced from precursors containing chiefly trihydrate have very high surface areas and high pore volumes. The aluminas in such catalysts are usually a mixture of transitional phases resulting from decomposition of alumina hydrates at relatively low temperatures, with essentially no alpha alumina present. They are sometimes described under the collective term of gamma alumina modifications. The present state of the art for calcining hydrous aluminas gives rolling weight crushing strength for 1/16" extruded pellets (via a method to be subsequently described) about as follows:

| Precursor Hydrate Composition | 90% Boehmite | 76% Trihydrate | 100% Gibbsite |
|---|---|---|---|
| Adiabatic calcination to 480° C. for 3 hrs. (with dry air stream), lbs | 14 | 10 to 14 | <2 |
| Further calcination 3 hrs. at 620° C. (with air stream containing about 20 mm. Hg H₂O pressure), lbs | 17 | 6 | |

Thus, it is seen that such transitional aluminas prepared from 100% trihydrate, e.g., gibbsite, precursors in this way are prohibitively weak for use as reforming catalysts. The boehmite-derived aluminas are quite strong, and maintain their strength after repeated regenerations very well. The alumina hydrate compositions containing a predominant amount of trihydrate, e.g., 76% trihydrate, give aluminas generally superior for reforming but lose strength to a stabilized lower value as a result of repeated regenerations.

For instance, the high trihydrate containing alumina hydrate compositions give precursor catalysts which after conventional adiabatic calcination disclose both longitudinal and transverse microcracks in their structure and result in catalysts exhibiting low mechanical strength as indicated by the bed crush test. It is believed that a reduction of the microcracks would result in catalysts exhibiting desirable mechanical stability characteristics.

The mixed trihydrate precursors are regularly of smaller trihydrate crystallite sizes than the pure gibbsite or bayerite precursors. This has a substantial beneficial effect on the physical properties of the calcined catalyst, since better bonding is afforded by the smaller crystallites.

An important object of the invention is to achieve alumina catalyst bases of superior physical properties when derived from aluminas containing a high trihydrate content. Such superior physical properties would include resistance of fragmentation and dusting under the conditions of a fixed bed commercial reforming unit. We believe this is best achieved on catalysts when the cracks and consequent fragmentation and fines are kept to a minimum since such fragmentation and fines are instrumental in producing packing thereby causing undue pressure drops and channeling in the catalyst bed.

A further object of the invention is to achieve such superior physical properties while maintaining the reforming performance characteristics, i.e. catalyst activity and life, of high trihydrate precursor alumina carrier catalysts.

An additional object of particular importance is to provide a catalyst especially favorable for short-cycle regenerative reforming conducted at high severity.

A more specific object of the present invention is the provision of a method for the preparation of catalyst bases, derived from alumina hydrates with a high trihydrate content, with superior physical properties, wherein the trihydrate water of crystallization of the alumina hydrate is removed at a more even or substantially uniform rate from the particles in the mass of hydrate material, thus avoiding a physical weakening of the particles. An additional specific object of the present invention is the provision of a method of this type wherein large quantities, for instance, commercial quantities, of the alumina hydrate particles can be expeditiously calcined to activated alumina of favorable catalytic performance and physical properties.

In accordance with the general method of the present invention, a mass of alumina hydrate particles containing a predominant amount of, or a major proportion of, for instance, about 50 to 95%, alumina trihydrate is precalcined, with rapid heating and without materially weakening the particles, by heating the discrete particles in the mass at a relatively even temperature in the range of about 200 to 600° C. in the presence of a gas to remove trihydrate water of crystallization of the alumina trihydrate at a substantially uniform rate throughout the mass of many of the particles for a period of time sufficient to substantially reduce the trihydrate content of the particles before final calcination to activated alumina.

The discrete particles can be heated in thin layers or by movement, e.g., tumbling, during heating and are preferably heated from more than a single direction such that the external surface area of discrete particles in the mass are directly and relatively evenly heated by the heat sources. Heating "from more than a single direction" includes emitting heat to the particles from more than a single point, the points generally being spaced at least about 90° from each other within an arc extending radially outwardly from the center towards the external surface area of the particles, and such heating may involve the use of a plurality, e.g., two, of heat sources, e.g., heated gas such as air, heat from infrared bulbs, radiant heat provided by the skin of a rotary calciner, and the like to heat the particles to remove trihydrate water of crystallization at a substantially uniform rate. When employing a plurality of heat sources, the heat sources can be alike or different and the heat emitting points are advantageously spaced from about 120 to 180° from each other. More than about 50%, for instance, more than about 50% and up to about 100%, but preferably from about 70% to 100%, of the apparent or external surface of at least about 10%, preferably at least about 60%, and up to about 100% of the particles in the mass are usually exposed to direct and relatively even heating. Generally, the trihydrate content is reduced to less than about 50%, preferably to less than about 30%, of the initial trihydrate content of the particles.

This precalcination can be effected by heating the particles in thin layers such as in hot belt drying procedures or in trays in an oven using a hot air stream but preferably by conducting the particles through a rotary calciner which affords an expeditious procedure. After the alumina hydrate particles have been precalcined, the calcination can be completed to obtain particles suitable for use as catalyst base precursors as described below.

The alumina hydrate particles may be either pieces formed by extrusion or tabletting, granules, or small powder particles. In the last case, the powder can be formed into pieces prior to the final calcination.

The gas employed in the method of the present invention is a heating or water removing gas such as air, which can be flowing; however, it can be one of the substantially inert gases such as flue gas, nitrogen, or mixtures of nitrogen and oxygen in proportions other than as in air, or it can be a reducing gas such as hydrogen. By the term "inert gas" we intend to designate gases which are essentially chemically inert as to the precursor base. Thus, in this sense air is considered an inert gas even though when the precursor base contains a metal sulfide, e.g., platinum sulfide, it may be converted to such as platinum oxide, platinum metal, or sulfate during contact with flowing air during calcination.

In a first embodiment of our precalcination process alumina hydrate particles are precalcined according to the above procedure to reduce the trihydrate content of the particles to less than about 50%. After the precalcination, alumina hydrate material containing, for instance, from about 15 to 30% alumina trihydrate can be provided using the precalcined particles as a result of either precalcining the particles directly to a trihydrate content of from about 15 to 30% or by precalcining the particles to less than about 15% trihydrate content, for instance, from about 0 to 15%, and blending the particles with a sufficient amount of trihydrate-containing alumina hydrate to provide the alumina trihydrate material containing from about 15 to 30% trihydrate.

In accordance with a second and preferred embodiment of our precalcination process, alumina hydrate particles are conducted through a rotary calciner with a retention time in the heated zone of about 5 to 300 minutes. Gas, e.g., air, can be heated, for instance, at temperatures from about 300° C. to 700° C., or can be at ambient temperatures and be admitted to the calciner at a rate sufficient to maintain the dew point below the temperature of the effluent gases and to prevent excessive condensation of water evolved from the catalyst mass. The gas removes water as soon as it is released from the particles to prevent undue sintering, equalizes the heat in the calciner, and is generally employed at a rate per hour from about 1 to 50 cubic feet of gas per pound of catalyst passed through the rotary calciner, and preferably from about 5 to 10 cubic feet of gas per pound of catalyst. The skin temperature of the rotary calciner is at a temperature sufficient to evenly release trihydrate water of crystallization from the particles and this temperature ranges preferably from about 325 to 450° C.

In a third embodiment of our precalcination process, alumina hydrate particles are precalcined by heating thin layers of the particles to expose them to heating from more than a single direction at temperatures generally from about 200° C. to 500° C., preferably from about 225° C. to 375° C., in the presence of a gas to substantially reduce the trihydrate content of the particles. The gas can be employed under the conditions set forth in the second embodiment. It will be obvious to those skilled in the art that the second and third embodiments above, and the fourth and fifth embodiments below, can be employed within the procedures set forth for the general method and the first embodiment of the present invention.

A fourth embodiment of our precalcination process consists of precalcining alumina hydrate powder, preferably by conducting the powder through a rotary calciner so that movement of the powder particles exposes them to heat from more than one side or direction. The temperature of the heating zone and time the powder remains in it is adjusted to reduce the trihydrate content of the powder to less than about 50%, preferably less than about 30% of the initial trihydrate content of the powder. Subsequently, the precalcined powder is formed into pellets and calcined at the desired temperatures to activate the catalyst.

In a fifth embodiment, alumina hydrate powder is similarly treated to give a precalcined product with a trihydrate content of less than 15%, and the powder is then blended with a sufficient amount of trihydrate-containing alumina hydrate powder to provide a mixed powder containing from 15 to 30% of alumina trihydrate, following which the material is formed into pellets and finally calcined to activated alumina.

After precalcination the calcination of the particles is completed to substantially remove water of crystallization from the trihydrate and monohydrate, followed by a further heating to stabilize the gamma alumina modifications and reduce the total water content, based on $Al_2O_3$, generally to below about 5%. The length of time for the completion of the calcination can be varied. Essentially we desire to substantially remove the water of crystallization and effect the desired increase in the surface area of the base particles. For reforming, it is usually desirable to stabilize the catalyst at about the temperature of operation, e.g., 480° C. The operator can, of course, stop the calcination at any time; however, the surface area of the calcined particles should be preferably at least about 350 square meters per gram. The completion of the calcination can continue as long as desired but should the temperature be too great for extended periods undue catalyst sintering and loss of surface area might be obtained. The calcined catalyst base generally contains upwards of about 2% by weight of volatile matter based on residue at 1100° C. and if calcined for instance at a maximum temperature of 480° C. with dry air and cooled with dry air (the dry air being <−70° C. dew point), such volatile matter generally constitutes from about 2 to about 5% of the weight of the base.

The calcined alumina particles which are gamma-alumina modifications exhibit excellent desiccating properties when cooled. In order to avoid picking up water from the atmosphere we prefer to cool the calcined particles under particular conditions. By this method the calcined particles are cooled to a convenient packaging temperature, e.g., less than about 50° C., through contact with an inert gas, preferably air, having a dew point of up to about 0° C. and preferably less than about −35° C. This pickup of water could also be avoided by placing the calcined catalyst while hot in a container followed by sealing of the container with the catalyst in the heated state.

When following the above procedures of the present invention it is believed that the trihydrate water of crystallization is removed initially from the whole mass of the composition at a relatively even or substantially the same rate. This can be distinguished from, for instance, adiabatic calcination using a gas as the essential heat source wherein the bed first reached by the hot gas is dehydrated while the more remote part of the bed is still wet. In the adiabatic procedure, hot air hits the top of the bed of alumina hydrate particles, a cross-sectional area of rapid removal of water moves progressively down the bed, and the particles are not uniformly dehydrated so that micro-fissures are formed.

The alumina hydrate compositions used in the method of the present invention contain a predominant amount, or a major proportion, of trihydrate and smaller amounts of amorphous or monohydrate forms of alumina. Usually about 65 to about 95 weight percent of the precursor hydrate is trihydrate comprising one or more of the gibbsite, bayerite and nordstrandite forms as defined by X-ray diffraction analysis. The substantial balance of the hydrous alumina composition is composed of amorphous hydrous alumina or a form corresponding after drying to monohydrate, e.g., boehmite, or mixture of these forms. The trihydrates are present as well defined crystallites when examined by X-ray diffraction means. The calcined catalyst in the virgin state is characterized by large surface area ranging from about 350 to about 550 or more square meters per gram as determined by the BET adsorption technique. The calcined catalyst also has a large portion of its pore volume in the pore size range of about 100 to about 1000 Angstrom units, generally having about 0.1 to about 0.5, preferably from about 0.15 to about 0.3, cc. per gram of pore volume in this range. Pore volumes are determined from desorption isotherms for nitrogen by the method of Barrett, Joyner and Halenda, JACS, 73, 373 (1951). The crystallite size of the precursor alumina trihydrate also is relatively large and usually is in the range of approximately 100 to 1000 Angstrom units.

The large pores may be formed by the trihydrates because of the fact that the trihydrates in the uncalcined state are indicated by X-ray diffraction as crystalline materials of about 100 to about 1000 Angstrom units crystallite size. These large pores are not formed during calcination but actually exist in the dried, uncalcined alumina. The small crystallite boehmite type of precursor alumina, such as is present with the trihydrates of our catalysts, is characterized by small crystallite size of the order of 40 Angstrom units before and after calcination and contains substantially no pores larger than 50 Angstrom units. It appears however that the presence of a minor proportion of the boehmite form or the amorphous hydrous alumina or their mixture in the precursor mixture is advantageous in insuring maximum retention of large-pore volume in addition to the normal fine-pore structure during catalyst preparation. Thus, those catalysts resulting from the use of alumina base precursors prepared by the method of our invention and characterized by the larger pore volumes contain about 5 to about 35 weight percent of boehmite or amorphous hydrous alumina or their mixture in the precusor mixture.

The alumina hydrate compositions containing the trihydrate and amorphous or monohydrate forms calcined in the present method can be prepared by various procedures. For instance, an alumina hydrogel may be formed by precipitating, for example, at temperatures of about 10 to 70° C., a gelatinous hydrous oxide from a solution of a soluble aluminum salt, such as aluminum chloride, by the action of a precipitating agent which is preferably ammonium hydroxide. Other sources of aluminum, such as aluminum sulfate or sodium aluminate, can be employed but subsequent washing may be more difficult than when employing aluminum chloride. When preparing the hydrate from aluminum chloride the gel formation is at a pH of about 7 to about 10 and preferably at least about 8. Extraneous ions introduced in the preparation, such as chloride ions, are removed by water washing to avoid corrosion difficulties in subsequent handling and to enable the aging of the hydrate composition. The alumina hydrogel is converted to the desired alumina hydrate by aging for a period of up to several days at a pH from about 7 to about 10 accompanied if desired by seeding with trihydrate crystallites. Suitable aging temperatures include from about 20 to about 40° C. This method of forming the alumina trihydrate composition useful in the present invention is described with particularity in the above-mentioned patent. This patent also describes the preparation of a platinum reforming catalyst from the trihydrate-containing precursor material which can include impregnation with platinum as through the use of chloroplatinic acid and hydrogen sulfide followed by drying and formation of particles, e.g. macrosize particles. These particles can be calcined according to the method of the present invention.

Generally, the alumina compositions employed in the method of this invention are combined with one or more catalytically active promoting metal components before use as a catalyst, for instance, with platinum, other platinum group noble metals, e.g., rhodium or palladium, or other catalytically active promoting metal or metal oxide components, e.g., chromia, cobalt-molybdena, etc. Thus, the alumina can be impregnated with the metal component before or after drying, after precalcination or even after final calcination if desired. In the latter cases it will usually be desirable to recalcine the base after addition of the metal component. Any of the various catalytic promoting metals or compounds can be employed on the base, and the selection of a particular promoter will usually depend upon the type of catalytic activity desired in the final product. Although the selection of a particular promoter and the method employed in depositing it on the catalyst base are not direct concerns of this invention, the base derived is particularly useful in manufacturing platinum group metal reforming catalysts, particularly platinum group metal alumina catalysts, containing generally from about 0.1 to about 1.5% or more of platinum group metal. The amount of metal may have some bearing relative to the physical properties of the catalyst, for instance, the maintenance of satisfactory physical properties with a platinum-alumina catalyst containing 0.35% platinum has been found to be more difficult than one containing 0.6% platinum.

The platinum group metal, e.g., platinum, can be incorporated into the base by adding an aqueous solution of chloroplatinic acid, for example, to the precursor alumina composition followed by precipitation of the platinum in situ by aqueous hydrogen sulfide solution or by gaseous hydrogen sulfide. The resulting slurry is dried, preferably rapidly. The mixture may be dried using a rotary drum type drier, or it may be prefiltered to reduce water content and chloride content prior to drying in an oven, or it may be spray dried. The dried precursor mixture then may be formed as by a tabletting or extruding operation.

The particles, e.g., formed particles or powder particles, are calcined in accordance with the present invention and should they contain organic matter, for instance die lubricant employed in tabletting, the calcination can be initiated with a mixture of air and nitrogen to avoid local hot spots through oxidation of the organic material. The formed particles, particularly if extruded, can be partially or completely dried before calcination. When calcining particles containing no organic material the use of nitrogen with the air would not be necessary.

In identifying the several trihydrate components and the amorphous and monohydrate forms and their amounts in the total hydrous alumina phase, X-ray diffraction techniques are employed on samples dried at 110° C. When designating herein the amount of trihydrate or amorphous and monohydrate forms present, it is referred to determinations made on samples of alumina hydrate dried at 110° C. which had not previously been dried. Also, the trihydrate form nordstrandite (also known as randomite and bayerite II) appears to be a trihydrate of crystalline form intermediate between the structure of the well-known gibbsite and bayerite with the randomite giving an X-ray diffraction line at 4.79 Angstrom units.

In accordance with the method of the present invention, after the alumina trihydrate containing material is partially, initially, or pre-calcined, the calcination can be completed, for instance, in a rotary calciner or in accordance with an adiabatic calcination procedure described in U.S. Patent No. 2,916,356. According to this procedure alumina hydrate particles are contacted with a heated gas, which is the essential heat source and is essentially chemically inert to the alumina hydrate, to remove remaining trihydrate water of crystallization at a temperature of up to about 400° C. The gas has a dew point of up to about 50° C. and is supplied at the rate of about 150 to about 1500 standard cubic feet per cubic foot of catalyst per hour and at a superficial velocity at about 0.05 to about 0.5 foot per second. The calcination of the particles is completed at a temperature from about 400 to about 650° C. by contact with a heated gas which is the essential heat source and is essentially chemically inert to the alumina hydrate. This gas is supplied at a rate from about 150 to about 1500 standard cubic feet per cubic foot of catalyst per hour and at a superficial velocity of about 0.05 to about 0.5 foot per second to obtain the desired calcined particles. The gas employed in completing the calcination has a dew point up to about 0° C.

The alumina hydrate particles initially calcined in accordance with the method of the present invention can be in the form of the drum-dried powder or in the form of macrosized particles or pellets. The alumina hydrate particles can be charged to the calciner as macrosize particles formed by tabletting or extrusion, preferably extrusion, and generally these particles are at least about 1/16" in both length and diameter and preferably do not exceed about 1/4" in diameter and 1/2" in length; however, larger and smaller particles can be employed and particularly their length may be as much as 1" or more. Ordinarily, these longer particles are broken before use in converting petroleum hydrocarbons. For extrusion, the alumina hydrates are generally dried to at least a plastic consistency, whereas for tabletting, they are usually dried to a powder. Prior to these forming operations the particles can be impregnated with a catalytically active metal component if desired. Moreover, when pre-calcining the powder form, the precalcined alumina hydrate can be extruded prior to final calcination and in this event, it is desirable that the alumina hydrate precalcined contain a relatively high amount of alumina trihydrate to obtain a good extrusion rate and product.

The present invention will be further illustrated by the following examples which are not to be considered limiting.

EXAMPLE I (A) This example illustrates the preparation of the alumina hydrate composition and a platinum-alumina reforming catalyst where it is preferred to employ relatively pure reagents in avoiding excessive contamination. Pure aluminum is dissolved in pure hydrochloric acid and the resulting solution is mixed with deionized water to form an aqueous aluminum chloride solution equivalent to approximately 65 grams of $Al_2O_3$ per liter. A separate deionized water solution of $NH_4OH$ is prepared containing approximately 65 grams of ammonia per liter. These two reagents in approximate volume ratio of 1:1 are intimately mixed as a flowing stream at a pH of 8.0. The flowing stream is passed to a stoneware container and an alumina hydrate is visible. The precipitated hydrate is filtered from the mother liquid and washed to <0.2% chloride by successive filtrations and reslurryings in deionized water until the desired chloride concentration is reached. The washed hydrate is covered with water in a container and aged at about 32° C. until it is approximately 70% trihydrate, the remaining being substantially of the amorphous or monohydrate forms. The total hydrate composition is comprised of 42% bayerite, 18% randomite, 11% gibbsite, 20% boehmite, and 9% amorphous as determined by X-ray diffraction analysis. The aged hydrate is mixed with deionized water in a rubber-lined container to provide a slurry of about 7 weight percent $Al_2O_3$ at a pH of about 8.0. A chloroplatinic acid solution in deionized water (0.102 gram platinum per milliliter) is stirred into the slurry to give a platinum content of about 0.35% on an $Al_2O_3$ basis. The slurry is then contacted with a deionized water solution which has been saturated with $H_2S$ at 25° C. to precipitate the platinum. The slurry is dried on a horizontal drum drier to give a powder of generally less than 20 mesh.

(B) A platinum-alumina hydrate drum-dried powder, prepared essentially by the procedure described in Example I(A) above, containing 0.35 percent platinum on an $Al_2O_3$ basis and about 74 percent alumina trihydrate, was conducted by tumbling through a laboratory-type rotary calciner in operation at a rate of 12 pounds per hour or for a retention time of about 8 to 12 minutes per particle under initial conditions in the calciner including the admission of air into the calciner at a rate of 2 cubic feet per minute in a direction opposite to movement of the powder and with the outside skin of calciner at a temperature of about 407° C. to provide radiant heat from more than one direction and relatively evenly heat substantially all of the external surface area of essentially all of the particles conducted through the calciner. The resulting powder was blended in a ribbon blender to provide 2,897 pounds of a composition containing 23 percent of alumina trihydrate and 23 percent of boehmite. Deionized water was added to material in the ribbon blender to minimize powder loss. Extrusion blends containing 32.5–34.0% free moisture were prepared by moisture adjustment in a Simpson mixer.

(C) About equal portions of the material prepared above in Example I(B) were extruded through 0.055 inch and 0.0625 inch dies. The two sizes of extrudate were charged to a commercial adiabatic calciner with a vertical divider separating the two beds. The catalysts were then finally calcined by a standard calcination procedure by disposition as a 27-inch deep fixed bed in a 6' diameter vertical calciner equipped for downflow of heated air through the bed. The air flow rate was about 425 standard cubic feet per minute, and the air had a dew point of −70° C. The incoming air was brought from room temperature to about 480° C. while taking about 9.5 hours for the lowermost portion of the bed to reach about 470° C. The 480° C. entering air flow was continued for about 2.5 more hours. The calcined catalyst was then cooled to about 40° C. with −70° C. dew point air in about 4.5 hours. The portions were separately removed from the calciner with a pneumatic unloading system. The 980 lbs. of 0.055" catalyst were assigned Lot No. RD-2402C (north) and 1,020 lbs. of 0.0625" catalyst were assigned Lot No. RD-2402C (south).

The tabulations in Table 1 compare the data obtained for the above prototype catalysts with data for a 32 lot composite of a standard catalyst prepared essentially according to the procedure set forth in Example I(A) above, which was calcined by the standard calcination procedure, essentially as described above, in Example I(C), and contained 0.35 percent platinum (based on $Al_2O_3$ content) and about 75% trihydrate in the precursor alumina hydrate. The tabulations are selfexplanatory so that only the pertinent points as they would concern production and specifications in accordance with the invention will be discussed.

Table 1
DATA FOR VIRGIN CATALYSTS

| Description | Catalyst Lot No. RD- | | |
|---|---|---|---|
| | 2402C (north) Prototype | 2402C (south) Prototype | Composite [a] 2306C–2337C Standard |
| Particle diameter, in | 0.0554 | 0.0622 | 0.0581 |
| Crushing strength, lbs. (after calcination at 480° C.) | 13.1 | 13.5 | 10.9 |
| Crushing strength, lbs. (after further heating at 620° C.) | 6.5 | 7.0 | 5.0 |
| Apparent density, gms./cc | 0.72 | 0.71 | 0.77 |
| Pore volume, cc./gm | 0.574 | 0.584 | 0.562 |
| Screen analysis: | | | |
| +12 mesh | [b] | 99.22 | 89.18 |
| 12–14 mesh | | 0.57 | 8.03 |
| 14–20 mesh | 0.14 | 0.04 | 1.73 |
| –20 mesh | 0.13 | 0.16 | 1.06 |
| Bed strength at 100 p.s.i.g. (prescreened): | | | |
| Percent breakage to –12 mesh | [c] | 1.46 | 10.47 |
| Percent breakage to –14 mesh | 0.79 | 0.68 | 2.16 |
| Percent breakage to –40 mesh | 0.17 | 0.17 | 0.33 |
| Relative activity [d] | 87 | 81 | 91 |
| Relative life [d] | 113 | 120 | 101 |

DATA FOR CATALYSTS AFTER VARIOUS HEAT TREATMENTS
[All catalysts prescreened prior to heating]

| Description | Catalyst Lot No. RD- | | |
|---|---|---|---|
| | 2402C (north) Prototype | 2402C (south) Prototype | Composite [a] 2306C–2337C Standard |
| Data for Catalysts Heated 16 Hrs. in a muffle furnace at 620° C.: | | | |
| Crushing strength, lbs., Bed Strength | 8.8 | 9.6 | 5.1 |
| Percent breakage to –12 mesh | | 4.63 | 19.97 |
| Percent breakage to –14 mesh | 1.76 | 2.48 | 7.06 |
| Percent breakage to –40 mesh | 0.37 | 0.59 | 1.07 |
| Data for Catalysts Heated 16 Hrs. in a muffle furnace at 730° C.: | | | |
| Crushing strength, lbs., Bed Strength | 6.5 | 7.3 | 4.9 |
| Percent breakage to –12 mesh | | 3.54 | 21.05 |
| Percent breakage to –14 mesh | 1.99 | 1.94 | 7.31 |
| Percent breakage to –40 mesh | 0.40 | 0.45 | 1.08 |
| Data for Catalysts Heated 16 Hrs. in a muffle furnace at 790° C.: | | | |
| Crushing strength, lbs., Bed Strength | 6.3 | 6.9 | 4.6 |
| Percent breakage to –12 mesh | | 3.27 | 20.90 |
| Percent breakage to –14 mesh | 1.74 | 1.81 | 7.61 |
| Percent breakage to –40 mesh | 0.41 | 0.43 | 0.91 |

[a] Average of data for the four 8-lot composites except for bed strength.
[b] +14 mesh = 99.73.
[c] Dia. some particles –12 mesh.
[d] Used only ⅛" long particles for naphtha reforming activity test. This data was obtained by subjecting the catalysts to an accelerated aging test. Conditions were 15 WHSV, 200 pounds pressure, 10/1 recycle ratio, and a 48-hour test period. The catalyst was tested in a bed of specified dilution. In terms of Research Octane Number (clear) data were obtained for Relative Initial Activity (R.A.) and Relative Life (R.L.) which were calculated on the basis of comparing a superior type of catalyst used commercially as the Test Standard with R.A. of 100 and R.L. of 100.

NOTES RELATIVE TO TABLE 1

(1) Crushing strength. The prototype catalysts have about 2 lbs. higher crushing strength than the standard catalyst; also, the after heat crushing strengths are about 1.5–2.0 or more lbs. higher.
(2) Pore volume. The total pore volume of the prototype catalysts is about 0.01–0.02 cc./g. more than the standard catalyst. This should be advantageous for low pressure reforming.
(3) Catalyst fines. The prototype catalysts contain substantially less fines than the standard catalyst.
(4) Bed strength. The bed strength of the prototype catalysts is much greater than obtained for the standard catalyst. This also holds for samples heated at 620–790° C.
(5) Activity and life. The activity and life of the prototype catalysts compare favorably to those of the standard catalyst.
(6) Chemical composition. Chemical composition includes:

| | 2402C (North) Prototype | 2402C (South) Prototype | Composite 2306C–2337C Standard |
|---|---|---|---|
| Percent Pt (ign. wt. basis) | 0.356 | 0.357 | 0.352 |
| Percent Volatile Matter | 3.50 | 3.50 | |
| Percent Fe | 0.0044 | | 0.0043 |
| Percent Cl | 0.39 | | 0.42 |
| Percent S | 0.07 | | 0.12 |

(7) Surface area. 2402C (North), prototype = 492 m.²/gram; composite 2306C–2337C, standard catalyst = 502 m.²/gram.

EXAMPLE II (1) *Catalysts 516–B89 and –B99.*—400 pounds of drum dried powder of 0.35 percent platinum and hydrous alumina with about 75% trihydrate was prepared essentially by the procedure described in Example I(A) above. The powder was then precalcined by relatively evenly heating substantially all of the external surface area of essentially all of the particles in a rotary calciner providing heating from more than one direction. Conditions included an inside drum temperature of 350–370° C., an air flow rate of about one cubic foot per minute and a retention time of about 10 minutes to give 273 lbs. of product which contained 78.5% solids with 23% trihydrates. (X.R.D. anal.: 60% amorphous, 17% boehmite, 13% bayerite, 6% randomite, 4% gibbsite.)

272 pounds of the precalcined powder were charged to a commercial size Simpson mixer and 65 liters of Dry Ice H₂O were added. The mix was very hot and on the "wet" side. The mix was cooled off and plasticized by passing it through an extruder without a die; the product contained 32% free moisture. The mix which was too wet for extrusion was stored overnight in polyethylene bags. The next morning the mix was dried out by passing through an extruder without a die; it contained 31% free moisture. The mix was then extruded at a normal rate through a 1/16" die, partially dried on the extruder table and stored in a fiber drum as sample 516–B88.

A pilot sample of 516–B88 was calcined according to the standard calcination procedure in a basket on the top of a standard charge of 0.35 percent platinum-alumina catalyst and assigned sample No. 516–B89. Sample 516–B89 had a crushing strength of 16.6 lbs. and an after heat crushing strength of 11.8 lbs.

A 129 pound sample of 516–B88 was calcined in a full depth basket with a standard lot of 0.35 percent platinum-alumina catalyst (Lot 2326–C). The full depth basket (10 mesh S.S. screen, 12" dia. x 36" long) was placed on the retention screen of the calciner and Lot 2326–C catalyst with same bed height (36") was packed around it to minimize by-passing. The catalyst received the standard calcination, but there is a good possibility that there was some by-passing since the bed shrinkage was greater for Lot 2326–C than for the basket sample. This catalyst was assigned Sample No. 516–B99.

Table 2 is a summary of the data obtained for calcined catalyst 516–B99 as compared to similar data for an eight lot composite of the standard catalyst, prepared in essentially the same manner as the standard catalyst described in Example I, and containing 0.35 percent platinum.

Table 2

| Catalyst No. | 516–B99 | Standard |
|---|---|---|
| Crushing Strength, lbs. (after calcination at 480° C.) | 16.1 / 15.9 | 11.8 |
| Crushing Strength, lbs. (after further heating at 620° C.) | 11.4 | 4.9 |
| Particle Diameter, in. | 0.0650 | 0.0581 |
| Apparent Density, (gms./cc.) | 0.73 | 0.76 |
| Bed Strength at 100 p.s.i.g.: | | |
| Percent breakage to −12 mesh | 1.83 | 8.44 |
| Percent breakage to −14 mesh | 1.06 | 2.87 |
| Total pore volume, cc./gm. | 0.575 | 0.557 |
| Relative Activity | 88 | 85 |
| Relative Life | 87 | 100 |
| Tests for Samples Heated 16 Hrs. at 620° C.: | | |
| Crushing Strength, lbs. | 11.2 | 5.4 |
| Bed Strength at 100 p.s.i.g.: | | |
| Percent breakage to −12 mesh | 1.36 | 14.37 |
| Percent breakage to −14 mesh | 0.88 | 5.49 |

Sample 516–B99 contained circumferential extrusion micro-cracks but no significant number of longitudinal calcination cracks. The composite of the standard catalyst contained the typical large number of calcination micro-cracks.

The above data clearly indicate that the mechanical stability of 0.35% Pt catalysts with alumina derived from trihydrate-containing alumina hydrate can be significantly increased by partially precalcining the drum dried powder prior to extrusion and standard calcination. The somewhat low life of 516–B99 is attributed to the relatively large particle diameter as compared to the standard catalyst.

EXAMPLE III

*Catalyst lot 2372C.*—A 1,107 pound lot of catalyst similar to 516–B99 was prepared for a partial charge to a commercial calciner. It was thought that the full depth basket might have allowed sufficient by-passing to partially invalidate the effects attributed to partially precalcining the drum dried powder. The approximately 45% charge to a commercial adiabatic calciner should fully indicate the results that would be expected from a 2,500 pound charge.

About 2,000 pounds of drum dried powder of 0.35 percent platinum-alumina (76% trihydrates) were precalcined by radiant heating the particles from more than a single direction in a Bartlett and Snow rotary calciner with an outside skin temperature on the order of 407° C. to relatively evenly heat substantially all of the external surface area of essentially all of the particles conducted through the calciner. Feed rate was at about 12 lbs. of drum dried powder per hour or a retention time in the calciner of about 8 to 12 minutes per particle and instrument air was fed at a rate of 2 c.f.m. in a direction opposite to movement of the powder for most of the run. An air rate of 1 c.f.m. was not sufficient to prevent condensation and subsequent build-up of material at the feed end of the calciner. During the precalcination several product samples were taken for X.R.D. analyses which indicated that the total trihydrates in the product varied at least between 2 and 42%. This wide variation was the result of inability to closely control feed and temperatures with the small rotary calciner. Small changes in feed rate resulted in major temperature fluctuations which ultimately affected the degree of trihydrate decomposition.

1,586 pounds of the precalcined product were placed in the ribbon blender and thoroughly mixed. (X.R.D. analysis of the blend showed 20% trihydrates; solids at 1100° C.=79.9%.) D.I. water was added to the mix in the blender to minimize powder loss.

Extrusion mixes were prepared from the blend by moisture adjustment in the Simpson mixer. The mixes were extruded through a 0.055" die (used a special small diameter die so that the final product would have a diameter of about 0.055"; this type extrudate does not shrink much on drying and calcination, therefore, it is necessary to extrude directly to the final desired particle size). The optimum moisture content for extruding this material was about 32%.

1,623 pounds of the extrudate, from the extruder drying table, were charged to a commercial adiabatic calciner. The catalyst was calcined at 480° C. by substantially the standard adiabatic procedure set forth in Example I above (used 400–450 c.f.m. of air instead of 500 c.f.m. of air normally used). The product was 1107 pounds of calcined catalyst which were assigned lot No. 2372–C.

Tables 3 and 4 compare the data obtained for lot 2372–C catalyst with the standard (lot 2362–C catalyst; the latter catalyst has good physical properties and is judged as being representative (as to physical properties) of the best 0.35% Pt-alumina catalyst that can be produced by present procedures. The alumina hydrate precursor for the standard catalyst contained 76% alumina trihydrates.

Table 3
DATA FOR VIRGIN CATALYST

| Description | Catalyst Lot No. | |
|---|---|---|
| | 2362–C Standard | 2372–C Precalcined |
| Particle Diameter, inches | 0.0576 | 0.0547 |
| Crushing Strength, lbs. (after calcination at 480° C.) | 12.0 | 13.2 |
| Crushing Strength, lbs. (after further heating at 620° C.) | 5.5 | Av. 6.7 |
| Apparent Density, gms./cc. | 0.77 | 0.72 |
| Surface Area, m.²/gm. | | 492 |
| Pore Volume, cc./gm. | | 0.581 |
| Screen Analysis: | | |
| +12 mesh | 88.10 | |
| 12–14 mesh | 9.23 | (1) |
| 14–20 mesh | 1.70 | 0.22 |
| −20 mesh | 0.97 | 0.30 |
| Bed Strength at 100 p.s.i.g. (prescreened): | | |
| Percent breakage to −12 mesh | | (2) |
| Percent breakage to −14 mesh | | 1.27 |
| Percent breakage to −35 mesh | | 0.32 |
| Relative Activity | | 72 / 81 |
| Relative Life | | 115 / 116 |

[1] +14 mesh=99.48.
[2] Dia. some particles −12 mesh.

Table 4
DATA FOR CATALYSTS AFTER VARIOUS HEAT TREATMENTS
[All catalysts prescreened prior to heating]

| Description | Catalyst Lot No. | |
|---|---|---|
| | 2362–C Standard | 2372–C Precalcined |
| Data for Catalysts Heated 16 Hrs. in a muffle furnace at 620° C.: | | |
| Crushing Strength | 6.8 | 7.7 |
| Surface Area | 301 | 299 |
| Metallic Pt 50 A | 0 | 0 |
| Bed Strength: | | |
| Percent breakage to −12 mesh | 13.98 | (1) |
| Percent breakage to −14 mesh | 3.94 | 1.35 |
| Percent breakage to −35 mesh | 0.60 | 0.33 |
| Data for Catalysts Heated 16 Hrs. in a muffle furnace at 675° C.: | | |
| Crushing Strength | 6.7 | 7.0 |
| Surface Area | 275 | 275 |
| Metallic Pt | (2) | (3) |
| Bed Strength: | | |
| Percent breakage to −12 mesh | 14.27 | (1) |
| Percent breakage to −14 mesh | 4.35 | 1.82 |
| Percent breakage to −35 mesh | 0.66 | 0.43 |
| Data for Catalysts Heated 16 Hrs. in a muffle furnace at 730° C.: | | |
| Crushing Strength | 4.7 | 6.8 |
| Surface Area | 242 | 245 |
| Metallic Pt | (4) | (5) |
| Bed Strength: | | |
| Percent breakage to −12 mesh | 18.30 | (1) |
| Percent breakage to −14 mesh | 4.79 | 2.27 |
| Percent breakage to −35 mesh | 0.67 | 0.43 |
| Data for Catalysts Heated 16 Hrs. in a muffle furnace at 790° C.: | | |
| Crushing Strength | 2.4 | 2.9 |
| Surface Area | 162 | 170 |
| Metallic Pt | | |
| Bed Strength: | | |
| Percent breakage to −12 mesh | 17.58 | (1) |
| Percent breakage to −14 mesh | 15.80 | 6.71 |
| Percent breakage to −35 mesh | 3.0 | 1.95 |

[1] Dia. some particles −12 mesh.
[2] 0.07% Pt at 110 A.
[3] 0.10% Pt at 110 A.
[4] 0.10% Pt at 300 A.; 0.25% Pt at 110 A.
[5] 0.10% Pt at 300 A.; 0.28% Pt at 110 A.

Prior to discussing the data of Tables 3 and 4, it should be pointed out that due to the nature of the crushing strength test, decreasing diameter of a given composition would be expected to decrease measured crushing strength. This results from the fact that the anvils do not form true tangents to the particles, and as particle diameter increases the anvil-particle contact area and load bearing are increased.

In comparing the data of Table 3 it will be noted that the diameter of the 2372–C catalyst particles is 0.003" less than the control catalyst. The virgin catalyst crushing strength and after heat crushing strength for catalyst 2372–C is somewhat higher than for catalyst 2362–C.

Catalyst 2372–C contains 80% less fines (−14 mesh) than catalyst 2362–C. It is interesting to note that catalyst 2372–C contained many particles up to ⅝" long, as compared to catalyst 2362–C with the maximum length of particles about ¼". This results from the fact that the 2372–C catalyst was sufficiently hard to minimize breakage during the pneumatic unloading of the calciner. Due to the longer particles in catalyst 2372–C the density is lower than desired. Breakage of hard particles to shorter lengths can be accomplished by increasing air velocity during unloading.

The pore volume of catalyst 2372–C is about 0.02 cc./gm. higher than usual for 0.35% Pt catalysts of this type. If this increase in pore volume is in the >100 A. pores, it may increase catalyst life for low pressure reforming.

The bed strength for catalyst 2362–C was not obtained, but based on other data for commercial lots of the standard catalyst, the bed strength of 2372–C appears to be excellent.

Table 4 summarizes the properties of catalysts 2362–C and 2372–C after various heat treatments. The data indicate that catalyst 2372–C has excellent stability. Also, the mechanical stability of catalyst 2362–C is higher than expected for the commercial standard catalyst.

EXAMPLE IV

The following illustrate the practice of the present invention wherein the precalcination is effected with the catalyst in thin layers. In Table 5, catalysts A, B, C and D were prepared essentially by the procedure described above in Example I(A). Unless stated otherwise, the platinum metal was added to slurries of the alumina hydrate as platinum chloride followed by the addition of excess $H_2S$, drum drying, extrusion through a 1/16" die, and standard calcination after the precalcination noted in the table. The alumina composition in the table is for the composition of the alumina after precalcination and before the final standard calcination. The alumina composition before the precalcination for catalysts A, B, and C was 14% boehmite, 36% bayerite, 31% randomite, and 10% gibbsite, a total of 77% trihydrate. Catalyst D, without the precalcination, is included to show a comparison of physical properties. Catalysts A, B, and C were precalcined in a Steiner Ives oven in thin layers in circular Pyrex crystallizing dishes of about seven inches diameter. Updraft air passed around the dishes with eddying to the top surface of the pellet bed, so that relatively even heating took place from more than a single direction. All catalysts were 1/16" extruded pellets and contained 0.6% platinum. The table also shows the results of reforming runs on catalysts A, B, and C using the 15 WHSV ratings described above.

Table 5

| Catalyst | A | B | C | D |
|---|---|---|---|---|
| Designation | 828-36C | 828-37C | 828-38C | 828-23C |
| Precalcination Conditions: | | | | |
| Temp., °C | 300 | 400 | 400 | None |
| Time, min | 15 | 5 | 15 | |
| Layer thickness, in | [1] 0.15 | 0.15 | 0.15 | |
| Alumina Composition, Wt. percent:[2] | | | | |
| Boehmite | 16 | 13 | 18 | 14 |
| Bayerite | 22 | 27 | | 36 |
| Randomite | 7 | 14 | | 31 |
| Gibbsite | 6 | 8 | | 10 |
| Total Trihydrate | 35 | 49 | 0 | 77 |
| Physical Properties of Final Catalyst | | | | |
| Crushing Strength, lbs.: | | | | |
| After calcination at 480° C | 17.0 | 14.5 | 15.7 | 14.4, 15.5 |
| After further heating at 620° C | 13.4 | 12.9 | 13.1 | 10.1 |
| Surface Area, m.²/g | 504 | 530 | 483 | 531 |
| Total pore vol., cc./g | .551 | .557 | .570 | .552 |
| Percent vol. matter as determined at 1,100° C | 3.93 | 4.17 | 4.06 | 4.43 |
| 15 WHSV Run Ratings: | | | | |
| Run No | 281 | 285 | 286 | |
| Relative Activity | 118 | 114 | 96 | |
| Relative Life | 82 | 87 | 101 | |
| Gas Make: | | | | |
| Cubic feet/bbl | 1,475 | 1,421 | 1,406 | |
| Decline percent | 37 | 36 | 27 | |

[1] 2 to 3 pellets thick.
[2] Alumina compositions after the precalcination are shown, except for Catalyst D.

The activity of catalyst 2372–C appears to be somewhat low, particularly for the small particle size. The life is excellent for this activity, and the activity may be a reflection of the particular composition prior to precalcination. It is believed that the regeneration efficiency for this catalyst is somewhat better than for commercial standard catalyst.

For several years, the reduced strength of the standard commercial catalyst after prolonged use in commercial reformers, has been attributed to the microcracks formed during calcination. Catalyst 2372–C contained a few extrusion (circumferential) micro-cracks but no calcination (longitudinal) micro-cracks. Catalyst 2362–C contained the typical number of calcination micro-cracks which are believed to decrease mechanical stability.

EXAMPLE V

Catalysts A to C and E to G in Table 6 illustrate various methods for impregnating the precalcined particles with the catalytically active metal. Unless stated otherwise, all impregnations were with 0.6% platinum as $H_2PtCl_6$, the extrusions were through a laboratory 1/16" die, and the final calcinations were conducted at a temperature of 480° C. using the standard adiabatic calcination procedure. Generally, favorable results are provided by catalysts prepared by the sequence of (1) precalcination of alumina, (2) blending with $H_2PtCl_6$, and (3) final adiabatic calcination since, in this sequence, lower temperature precalcinations to a minimum temperature necessary to remove trihydrate give better physical properties in the final product.

alyst 2.5" in diameter and about 1 inch deep. Normal conditions are 100 pounds pressure for a half hour. Per-

*Table 6*

| Catalyst | A | B | C |
|---|---|---|---|
| Designation | RD(291-2)-P15-E2C | RD185-PK646-E2C | RD(291-2)-PK626-E2C |
| Alumina Percent: | | | |
| Uncalcined: | | | |
| Boehmite | 8 | 22 | 8. |
| Trihydrate | 86 | 78 | 86. |
| As Precalcined: | | | |
| Boehmite | 0 | 15 | 15. |
| Trihydrate | 0 | 5 | 0. |
| $Al_2O_3$ | 84.1 | 90 | 93. |
| Physical Properties of Final Catalyst | | | |
| Crushing Strength, lbs.: | | | |
| After calcination at 480° C | 18.2 | 17.7 | 15.0. |
| Surface Area, m.²/g | 507 | 452 | 445. |
| Total pore, vol. cc./g | .560 | .605 | .578. |
| Percent Volatile at 1,100° C | 2.97 | 2.42 | 2.79. |
| 15 WHSV Run Ratings: | | | |
| Run No | 267 | 177 | 149. |
| Gas Make: | | | |
| Ft.³/bbl | 1,185 | 1,297 | 1,343. |
| Decline percent | >70 | >70 | 59. |
| Remarks Regarding Precalcination and Metal Impregnation. | Precalcined powder not rewetted before impregnation; R.C.[1] at 700° F.; R.T.[2] blend with $H_2PtCl_6$ in Day mixer. | Precalcined powder not rewetted before impregnation; Tray calc. at 300° C.; hand blend with $H_2PtCl_6$ at R.T. | Precalcined powder wet but only only slightly rehydrated before impregnation; Tray calc. at 300° C.; hand blended with $H_2PtCl_6$ and $H_2S$ at 5° C. |

| Catalyst | E | F | G |
|---|---|---|---|
| Designation | RD185-PE2C-K597C | RD185-PE2C-K639H | RD185-PE2C-K642H |
| Alumina Percent: | | | |
| Uncalcined: | | | |
| Boehmite | 22 | 22 | 22. |
| Trihydrate | 78 | 78 | 78. |
| As Precalcined: | | | |
| Boehmite | 15 | 15 | 15. |
| Trihydrate | 5 | 5 | 5. |
| $Al_2O_3$ | 90 | 90 | 90. |
| 15 WHSV Run Ratings: | | | |
| Run No | 163 | 170 | 171. |
| Gas Make: | | | |
| Ft.³ bbl | 1,343 | 895 | 1,064. |
| Decline Percent | (58) | >70 | >70. |
| Remarks Regarding Precalcination and Metal Impregnation. | Precalcined pellets impregnated; Tray calc. powder extruded and calcined, impregnated $H_2S$, then 0.6% Pt as $H_2PtBr_6$. | Precalcined pellets impregnated; similar pellets impregnated 1.3% Pd as $PdCl_2$. | Precalcined pellets impregnated; similar pellets impregnated 0.3% Pt–0.3% Pd. |

[1] R.C.—Rotary calciner used with about 6 minutes heating of the powder passing through the calciner.
[2] R.T.—Room temperature.

*Physical properties test procedures.*—A variety of tests have been evaluated as measures of physical properties. Pellet crushing strengths may be determined directly by comparative crush measurements. A convenient test is the rolling weight crush test which includes the use of two hinged bars for crush determinations, the first calibrated for 1½ to 10 lbs. and the second calibrated for 5 to 25 lbs. A 1 kg. weight is rolled on the bar or bars and the crushing weight is noted. Ordinarily, regular crushes are run on the second bar only, and "after heat" crushes on the first bar, followed by the second bar if the pellet is still unbroken.

In this method, a few pellets at a time are usually removed from a sample vial, followed by recapping the vial. Pellets without defective ends and close to ⅛" long (as measured on scale paper) are selected and placed in the bar with forceps. The weight is rolled at a rate of about one pound per second (faster rates give higher values). After each sample the plate on which the pellet was placed is cleaned with emery paper.

Cracks in a calcined 1/16" extrudate may be estimated by a bridging strength test, in which the ends of the pellet are placed on knife edges and the center of the pellet is pressed down by a third knife edge. This test has the defect that results are not very reproducible.

Cracks may also be estimated by photographs of the calcined pellets by wetting the calcined pellets with 1:10 diluted blue ink or dye, air drying, covering with mineral oil, and photographing the pellets with color-sensitive film.

The bed crush test consists of applying a given pressure for a given time to a piston riding on a bed of cat-cent total breakage and percent breakage to less than ¼ the original diameter are determined, the latter breakage being considered particularly serious from a pressure drop standpoint. Estimation of the amount of breakage is made with 8 inch diameter standard sieves in a 15-minute screen analysis with a Ro-Tap shaking machine. Before the Bed Crush Test is run, any fines are removed with the largest size sieve which does not pass the pellets. Following the Bed Crush Test, this sieve and one with opening distance about a quarter as large are used for the screen analysis. For instance, with 60 mil diameter pellets, the first sieve used is U.S. No. 14, with a 55.5 mil opening, and the second sieve, U.S. No. 45 with a 13.8 mil opening; other sieves are occasionally used to establish the particle size of broken catalyst.

We claim:
1. In the process of preparing a catalytically active metal-activated alumina catalyst wherein alumina hydrate particles containing a predominant amount of alumina trihydrate are calcined to activated alumina, the improvement consisting essentially of initially calcining discrete particles of the alumina hydrate by conducting the particles through a rotary calciner having an internal temperature of from about 200° C. to 600° C. in the presence of a hot flowing gas inert to the alumina to remove trihydrate water of crystallization at a substantially even rate and substantially reduce the trihydrate content of the particles to less than about 50 weight percent of the original amount, said particles being exposed to heat from more than a single direction and having a retention time in the calciner of about 5 to 300 minutes.

2. The method of claim 1 wherein more than about 50 percent of the external surface area of the discrete particles is relatively evenly heated.

3. In the process of preparing a catalytic metal-activated alumina catalyst wherein a mass of alumina hydrate particles containing a predominant amount of alumina trihydrate is calcined to activated alumina, the improvement which consists essentially of initially calcining discrete particles with heating from more than a single source at temperatures from about 200 to 600° C. to relatively evenly heat the particles in the presence of a flowing gas inert to the alumina to substantially reduce the trihydrate content of the particles to less than about 50 weight percent of the original amount before final calcination to activated alumina, said heating from more than a single source comprising emitting heat to the particles from a plurality of points spaced at least about 90° from each other as determined at the centers of the particles within an arc positioned radially outwardly from the center towards the external surface area of the particles.

4. In the process of preparing a catalytic metal-activated alumina catalyst wherein a mass of macrosize alumina hydrate particles containing initially from about 50 to 95% of alumina trihydrate is calcined to activated alumina, the improvement of initially calcining discrete macrosize particles of the alumina by relatively evenly heating more than about 50 percent of the external surface area of at least about 10 percent of the discrete particles at temperatures within the range of from about 200° to 600° C. in the presence of a flowing gas inert to the alumina to remove trihydrate water of crystallization of the alumina trihydrate at a substantially uniform rate for a period of time in excess of about 5 minutes and sufficient to reduce the trihydrate content of the particles to less than about 50 percent of the initial amount before final calcination to activated alumina, said heating comprising emitting heat to the particles from a plurality of points spaced at least about 90° from each other as determined at the centers of the particles within an arc positioned radially outwardly from the center towards the external surface area of the particles.

5. The process of claim 4 wherein said trihydrate content of the particles is reduced to less than about 30 percent of the original amount.

6. The process of claim 4 wherein between about 70 and 100 percent of the external surface area of from about 60 to 100 percent of the discrete particles are heated.

7. The process of claim 4 wherein said discrete macrosize particles are impregnated with said catalytic metal prior to said initial calcination.

8. In a process of preparing a catalytic metal-activated alumina catalyst comprising impregnating alumina hydrate containing a predominant amount of alumina trihydrate with a promoting amount of said catalytic metal and drying the alumina hydrate to remove free water, and then calcining the alumina hydrate particles to activated alumina, the improvement of precalcining discrete macrosize particles of said impregnated and dried alumina hydrate before said calcining by a process consisting essentially of conducting the particles through a rotary calciner having an internal temperature of from about 200° C. to 600° C. in the presence of a flowing hot gas inert to the alumina to remove trihydrate water of crystallization at a substantially even rate and reduce the trihydrate content of the particles to less than about 50 percent of the original amount of trihydrate present in the particles, said particles being exposed to heat from more than a single direction and having a retention time in the calciner of about 5 to 300 minutes.

9. The process of claim 8 wherein the flow rate of said gas is from about 1 to 50 cubic feet of gas per pound of catalyst passed through the calciner.

10. The process of claim 8 wherein the skin temperature of the calciner is from about 325° to 450° C.

11. In a process of preparing a catalytic metal-activated alumina catalyst comprising impregnating alumina hydrate containing a predominant amount of alumina trihydrate with a promoting amount of said catalytic metal and drying the alumina hydrate to remove free water, and then calcining the alumina hydrate particles to activated alumina, the improvement of extruding said impregnated and dried alumina hydrate before said calcining to produce discrete macrosize particles of said hydrate and initially calcining said discrete macrosize particles before the calcining step by a process consisting essentially of conducting the particles through a rotary calciner having an internal temperature of from about 200° C. to 600° C. in the presence of a hot flowing gas inert to the alumina to remove trihydrate water of crystallization at a substantially even rate and reduce the trihydrate content of the particles to less than about 50 percent of the original amount of trihydrate present in the particles, said particles being exposed to heat from more than a single direction and having a retention time in the calciner of about 5 to 300 minutes.

References Cited by the Examiner

UNITED STATES PATENTS

| | | | |
|---|---|---|---|
| 2,769,688 | 11/1956 | Milliken | 23—143 |
| 2,838,375 | 6/1958 | Teter et al. | 252—463 |
| 2,838,445 | 6/1958 | Teter et al. | 252—466 |
| 2,898,307 | 8/1959 | Keith | 252—463 |
| 2,916,356 | 12/1959 | Keith et al. | 252—463 |
| 2,950,169 | 8/1960 | Murray et al. | 23—143 |
| 2,965,564 | 12/1960 | Kirshenbaum | 252—466 |
| 3,096,154 | 7/1963 | Stewart | 252—463 X |

BENJAMIN HENKIN, *Primary Examiner.*

JULIUS GREENWALD, MAURICE A. BRINDISI,
*Examiners.*